UNITED STATES PATENT OFFICE 2,113,596

ALCOHOLIC BEVERAGES OF REDUCED INEBRIATING CAPACITY

Leon Lilienfeld, Vienna, Austria

No Drawing. Application June 29, 1933, Serial No. 678,303. In Austria July 11, 1932

17 Claims. (Cl. 99—30)

This invention relates to beverages containing ethanol and the production thereof, and in accordance therewith, beverages containing ethanol are produced or treated in such a manner as to give improved alcoholic beverages having either no inebriating properties or reduced inebriating properties, as compared with the alcoholic beverages of the same ethanol content heretofore used, all as hereinafter set forth in detail.

Each of the terms "beverage containing ethanol" or "alcoholic beverage" or "drink containing ethanol" or "alcoholic drink" is intended to include any kind of solutions of ethanol, of the concentrations used as beverages, or beverages of any kind containing ethanol in any suitable concentration, and also other articles containing ethanol and intended for enjoyment (for example preserves containing ethanol).

The object of the present invention is to obtain alcoholic beverages which have a substantially reduced inebriating effect (as compared with the customary alcoholic beverages of like alcoholic content), or even having substantially no inebriating effect. The invention further embraces methods of producing such beverages.

The invention resides in the surprising discovery that ethanol wholly or partly loses its inebriating (and seemingly some of the other unfavorable) effects when one or more derivatives of carbohydrates of the type $n(C_6H_{10}O_5)$ in which at least one hydroxyl hydrogen atom is substituted (and especially by an organic radical) such as ethers, (particularly alkyl derivatives) or ether esters of carbohydrates of the type $n(C_6H_{10}O_5)$ is or are dissolved in a beverage containing ethanol. Or the said carbohydrate derivatives can be introduced at any suitable stage of the manufacture of said beverage.

The invention is further based on my discovery that, owing to their solubility in dilute aqueous solutions of ethanol and to the almost unlimited miscibility of their solutions in aqueous ethanol with water or with other potable aqueous liquids, to their perfect harmlessness and to the fact that they are very well tolerated in the human system, those derivatives of aforementioned nature, especially ethers of carbohydrates of the type $n(C_6H_{10}O_5)$ which are soluble in aqueous ethanol (and particularly those that are soluble both in aqueous ethanol and in water) accomplish the object of the invention in a very satisfactory manner from a physiological and technological point of view and, thus, fully develop the new effect of the present invention. Ethers and ether-esters containing an organic acid radical of these carbohydrates can be referred to as "oxy-organo compounds" of these carbohydrates.

In other words: the present invention is based on my discovery that beverages containing ethanol and which, nevertheless, have no inebriating effect or only a reduced inebriating effect, are obtained when, at any suitable stage of their preparation (of course including their finished state) they are brought into contact with one or more derivatives of carbohydrates of the type $n(C_6H_{10}O_5)$, in which at least one hydroxyl hydrogen atom is substituted, such as ethers, particularly with one or more of those alkyl derivatives of carbohydrates of the type $n(C_6H_{10}O_5)$, which are soluble in aqueous ethanol (e. g. in alcoholic beverages) or in water and in aqueous ethanol of alcoholic strength corresponding to alcoholic beverages or to diluted alcoholic beverages. And the other injurious effects of alcoholic beverages, are also, to some extent at least, reduced by the presence of said carbohydrate derivatives in the alcoholic beverages.

The best results are secured by the use of such etherified derivatives of carbohydrates as are soluble in the alcoholic beverage to which the same are to be added, and which remain dissolved therein upon dilution with water, carbonated water or such other aqueous liquids as are commonly used for diluting alcoholic liquors (e. g. in making up mixed drinks). But it is immaterial whether the carbohydrate derivatives are soluble in pure alcohol or not. They should be soluble in the undiluted alcoholic beverage, and in the said beverage after dilution.

The novel effect of the invention expresses itself, above all, in the fact that, as has been proven in a great number of experiments, even such doses of ethanol (taken, of course, in a diluted condition, i. e. as an alcoholic beverage, which may be full strength or diluted) as per se cause drunkenness with the individuals in question (human beings or animals) do not produce appreciable symptoms of drunkenness when before being taken the alcoholic beverage receives an appropriate addition of a suitable derivative of a carbohydrate of the type $n(C_6H_{10}O_5)$, in which an organic radical is substituted for at least one hydroxyl hydrogen atom, particularly a non-poisonous ether of a carbohydrate of the type $n(C_6H_{10}O_5)$, which ether is soluble in said alcoholic beverage. In addition, the amounts of actual ethanol so taken in conjunction with a suitable carbohydrate derivative as stated, which pass into the blood are, in most cases, much smaller than the quantities of ethanol which pass into the blood when the same alcoholic beverage is taken, but without said carbohydrate derivative, and that the ethanol so taken in conjunction with a carbohydrate derivative of the kind stated, disappears from the blood more quickly than the ethanol of an alcoholic beverage which is taken by itself.

Throughout this specification, where "parts" or "percentages" are stated, they are given as parts or percentages by weight.

The experiments have shown that the alkyl ethers, hydroxy-alkyl and mixed ethers of the carbohydrates which are soluble in the said alcoholic beverages and in water, are apparently the most effective (for eliminating or reducing the inebriating effect).

An important feature of the present invention is also the harmlessness of the derivatives of carbohydrates of the type $n(C_6H_{10}O_5)$ used in the present process for reducing the inebriating and/or other injurious properties of alcoholic beverages, for example of the suitable etherified derivatives of the carbohydrates of the type $n(C_6H_{10}O_5)$. This also has been proven by systematic tests.

It is characteristic of these etherified derivatives of the carbohydrates of the type $n(C_6H_{10}O_5)$, that they are not decomposed by the digestive ferments. Consequently they pass through the intestine and leave the body without any influence on the metabolism. The solution or sorption between suitable specimens of these cellulose-derivatives and ethanol, is so stable, that a considerable part of the ethanol of such alcoholic beverages as contain an adequate amount of these carbohydrate ethers does not enter the body through the intestinal wall. Therefore, the addition of these substances to alcoholic beverages is capable of preventing the organism from being overflown by the ethanol, even when a person drinks large quantities.

A further favorable feature of this invention is the fact that the presence of one or more suitable derivatives of carbohydrates of the type $n(C_6H_{10}O_5)$ in which at least one hydroxyl hydrogen atom is substituted, for example of a suitable alkyl derivative of cellulose or of starch or the like does not injuriously affect or change the taste and flavor of the alcoholic beverages and, in some cases, is even capable of improving their taste.

The present invention relates to beverages of any kind containing ethanol, for example spirits and liquors, for instance brandy, whisky, gin, absinth or the like, liqueurs, wine of any kind, champagne or other sparkling wine, fruit wine of any kind, for example cider, perry or the like, beer of any kind, aperitifs, bitters, in short, alcoholic beverages of any kind in the finished state or in the course of their preparation, or in the state of intermediate products or materials intended for, or used in, the preparation of alcoholic beverages.

Generically, the invention consists in reducing the inebriating power of ethanol in any form intended for, or used in the preparation of alcoholic beverages, which has a reduced inebriating power and/or reduced other injurious properties, and therefore consists in beverages of any kind containing ethanol, which beverages possess the property that the inebriating and/or other unfavorable effects of the ethanol contained therein is reduced.

The invention includes alcoholic beverages of any kind which have an inebriating capacity reduced below the inebriating capacity corresponding to the proportion of ethanol contained therein.

Specifically, the invention consists in ethanol in any form which, owing to the presence of at least one derivative of a carbohydrate of the type $n(C_6H_{10}O_5)$ in which at least one hydroxyl hydrogen atom is substituted, preferably by an organic radical, particularly of at least one ether of a carbohydrate of the type $n(C_6H_{10}O_5)$, has a reduced inebriating power, and in beverages of any kind containing ethanol which, owing to the presence of at least one derivative (preferably organic) of a carbohydrate of the type $n(C_6H_{10}O_5)$ in which at least one hydroxyl hydrogen atom is substituted, particularly of at least one ether of a carbohydrate of the type $n(C_6H_{10}O_5)$, have an inebriating capacity reduced below the inebriating capacity corresponding to the proportion of ethanol contained therein.

Accordingly, the invention comprises ethanol in any form and alcoholic beverages of any kind which contain at least one derivative of a carbohydrate of the type $n(C_6H_{10}O_5)$ in which at least one hydroxyl hydrogen atom is substituted (preferably by an organic radical) particularly at least one ether of a carbohydrate of the type $n(C_6H_{10}O_5)$.

The invention further comprises a process of preparing beverages of any kind containing ethanol, wherein at least one derivative of a carbohydrate of the type $n(C_6H_{10}O_5)$ in which at least one hydroxyl hydrogen atom is substituted, particularly at least one ether or ether-ester of a carbohydrate of the type $n(C_6H_{10}O_5)$ (which ether or ether-ester is soluble in said beverage) is introduced into an alcoholic beverage in any suitable stage of its preparation, its finished state included.

In other words: The process comprises introducing into an alcoholic beverage in its finished or partly finished state, or into one or more materials intended for, or used in, its preparation, or into one or more intermediate products or ingredients intended for, or used in, its preparation, at least one derivative of a carbohydrate of the type $n(C_6H_{10}O_5)$ in which at least one hydroxyl hydrogen atom is substituted, particularly at least one ether of a carbohydrate of the type $n(C_6H_{10}O_5)$.

The present invention is based on a new inventive principle, namely on the principle of reducing the inebriating power of an alcoholic beverage not by diminishing the quantity of ethanol contained therein, but by introducing into the alcoholic beverage one or more carbohydrate derivatives of the type set forth, capable of reducing the inebriating capacity of the beverage below the inebriating capacity corresponding to the quantity of ethanol contained therein.

Many representatives of the derivatives of carbohydrates of the type $n(C_6H_{10}O_5)$ in which at least one hydroxyl hydrogen atom is substituted, may be be used in this invention. According to the present state of my knowledge, it seems however that preference is to be given to ethers or ether-esters of carbohydrates of the type $n(C_6H_{10}O_5)$, and, since the carbohydrate ether or ether-ester in question is to be at least in part, dissolved in the final beverage, derivatives will be used which are soluble in dilute ethanol and in water. Since all alcoholic beverages contain at least some water, such ethers or esters of carbohydrates of the type $n(C_6H_{10}O_5)$ as are soluble in aqueous ethanol solution will dissolve in most alcoholic beverages. There are however alcoholic beverages which contain substances that are capable of forming precipitates with some certain carbohydrate derivatives, such as ethers of carbohydrates of the type $n(C_6H_{10}O_5)$, (for example some tanning substances contained in red wine or some substances contained in some liqueurs). In all cases there should be used a carbohydrate ether that can in part at least, be held in solution in the finished said beverage itself, and in the beverage, after dilution, (if it is to be diluted, i. e. if it is a kind of alcoholic beverage which is sometimes diluted before being consumed).

The process may be carried out, for example, by introducing into an alcoholic beverage at least one derivative of a carbohydrate of the type $n(C_6H_{10}O_5)$ in which at least one hydroxyl hydrogen atom has been substituted by an organic radical (for example an ether or an ether-ester) by dissolving it, either in the finished beverage or in the beverage at any stage of its preparation, or in the liquid from which the beverage is to be made, or an intermediate material intended for, or used in, the preparation of the beverage in question. Or the said carbohydrate derivative can be added to one of the solid materials used in producing the beverage.

When the final product is to contain, besides ethanol, substances imparting special taste or flavor, or sweetening substances, or juices of fruit, or syrups, or aromatic substances, such as aromatic essences or oils, or coloring matters, in short any material or materials other than ethanol and water, the derivatives of the carbohydrates or their solutions, as far as it is compatible with the nature of the respective ingredient or ingredients, may be incorporated with these materials and then added. The carbohydrate derivatives may also be introduced into the alcoholic beverages by incorporating them with the solution of ethanol intended for the final product which may or may not contain some other ingredients to be present in the final product.

As ethers of carbohydrates suitable for my invention, the following may be named by way of example to which however the invention is not limited: Alkyl derivatives, such as methyl derivatives or ethyl derivatives or propyl derivatives of cellulose, or of starch or of soluble starch, or of dextrine, or of hemicellulose or of amyloid, or of inuline, or of tragacanth, or of lichenin, or of agar-agar, or of glycogen or the like.

As mentioned above, according to the invention, I employ such derivatives of carbohydrates of the type $n(C_6H_{10}O_5)$, particularly ethers, such as alkyl derivatives, as are soluble in aqueous solutions of ethanol, especially of such strengths as occur in ordinary alcoholic beverages, i. e. for example, in aqueous solutions of ethanol of about 3 to about 40 or 60 per cent strength. And, since many alcoholic beverages, before being taken, are often diluted with water or mineral water or carbonated water, such derivatives of carbohydrates of the type $n(C_6H_{10}O_5)$, particularly ethers, for example alkyl derivatives, as are soluble in aqueous solutions of ethanol and in water are highly suitably for such cases.

A derivative of the kind in question of a carbohydrate of the type $n(C_6H_{10}O_5)$ for example an ethyl- or methyl-cellulose soluble in aqueous ethanol or in aqueous ethanol and in water, or an ethyl- or methyl-starch soluble in aqueous ethanol or in aqueous ethanol and in water, or an ethyl- or methyl-dextrine soluble in aqueous ethanol or in aqueous ethanol and in water, may be introduced into the beverage in substance, for example by dissolving it in the finished beverage. Or, it may, so far as is compatible with the character and nature of the beverage and with the other materials used or other working conditions, be dissolved in an aqueous ethanol solution of the strength selected for the final product (which aqueous ethanol solution may or may not contain some other ingredients intended for the final product or which, after having been incorporated with the carbohydrate derivative, may be mixed with the other nonalcoholic ingredients intended for the final product) or in an aqueous ethanol solution of lower or higher strength than the strength of ethanol intended for the final beverage. Alternatively the derivatives of the kind in question of the carbohydrates of the type $n(C_6H_{10}O_5)$ for example the water-soluble ethers set forth above, may, so far as they are compatible with the other materials used and other working conditions, be incorporated with the alcoholic beverages also in such a manner that they are, dissolved or swollen in water and the thus obtained pastes or solutions added to an aqueous ethanol solution or to any other materials intended for, or used in the preparation of the beverages, or added to the finished alcoholic beverage.

The concentration of the aqueous solution of the carbohydrate derivative to be added to the alcoholic beverage will, above all depend on the proportion of water desired in the finished alcoholic beverage. If it is intended considerably to dilute with water the alcoholic beverage in hand, the concentration of the aqueous solution of the carbohydrate derivative may be moderate. If, however, it is desired to add to the alcoholic beverage only a small quantity of water, the aqueous solution of the water-soluble derivative of carbohydrate must be concentrated, so that, in individual cases, it may be not a flowable solution, but a paste or a gel.

The mode of procedure which consists in adding an aqueous solution of a water-soluble derivative of a carbohydrate of the type $n(C_6H_{10}O_5)$, for example a water-soluble representative of such derivatives as, by way of example, are set forth in the foregoing paragraphs, may also be adopted in such cases in which, before being taken, the alcoholic beverage is diluted with water. In such instances, the water-soluble carbohydrate derivative may be dissolved in the water or mineral water or soda water or the like which is intended for being mixed with the alcoholic beverage in question, such as whisky, brandy, gin, absinth, wine or the like.

As far as alcoholic beverages the preparation of which comprises fermentation, but no distillation, are concerned, the derivatives of the carbohydrates characteristic of the present invention may be incorporated with the parent material or intermediate product intended for or subjected to fermentation, being added before or during the fermentation. This modification of the process is recommendable for example in case of such beverages as contain carbon dioxide, such as champagne or other sparkling wines or beer or sparkling ciders or the like, and is the more feasible, since at least most of the carbohydrate derivatives characteristic of the present invention are not fermentable.

The carbohydrate derivatives can be incorporated with the alcoholic beverage (at any other stage of its production) in any suitable manner.

As to the quantity of the suitable derivatives of carbohydrates of the type n(C₆H₁₀O₅) to be used, my experience has shown that small amounts of the carbohydrate derivatives suffice to bring about the effect of the invention, i. e. to reduce the inebriating effect of the ethanol or of the alcoholic beverages.

In this specification, percentages of ethanol in beverages, etc., are given by weight, and "parts" are given by weight. "Alcoholic" refers to containing ethanol. Stated generally, it suffices to dissolve in the alcoholic beverage an amount of a suitable carbohydrate derivative which is from about 10 parts up to about 25 parts of one of the carbohydrate derivatives, per 100 parts of real ethanol contained in the beverage, but the invention is not restricted to these absolute quantities. Thus, in whisky containing 36% of ethanol (i. e. whisky of about 86 proof), or in a liqueur containing 35% of ethanol (83.8 proof) 4% of a cellulose ethyl ether soluble in aqueous ethanol and in water was dissolved. 1.5% of an ethyl ether of cellulose soluble in water and in dilute ethanol, was dissolved in white wine containing 10% of ethanol.

If in some individual cases alcoholic beverages are prepared according to the present invention for people who are not very sensitive to ethanol, even smaller quantities than 10 to 25 parts by weight per 100 parts by weight of ethanol may be incorporated with the alcoholic beverages in question.

The following examples are given, purely by way of illustration, and without restricting the invention thereto.

*Example 1*

In a whisky or brandy or other liquor prepared by fermentation followed by distillation, an ethyl or methyl cellulose or an ethyl or methyl starch or an ethyl or methyl dextrin that is soluble in aqueous ethanol and soluble in the liquor used, and is soluble in said liquor after dilution with water, is dissolved to an extent corresponding with 10 to 25 per cent of the ethanol contained in the quantity of beverage to be treated according to the invention. The cellulose- or starch- or dextrin-ether may be dissolved in the liquor either by adding the carbohydrate ether to the liquor or vice-versa, preferably with stirring or agitation of the vessel. The operation may be performed at any time between the distillation and consumption of the liquor.

*Example 2*

The process is conducted as in Example 1, but with the difference that, instead of in the liquors treated therein, the carbohydrate ether is dissolved in a different liquor.

*Example 3*

The process is conducted as in Example 1, but with the exception that, instead of in the liquor treated therein, the carbohydrate ether is dissolved in a wine (for example in red wine or in white wine).

*Example 4*

The process is conducted as in Example 1, but with the difference that, instead of in the liquor treated therein, the carbohydrate ether is dissolved in an aperitif.

*Example 5*

An ethyl or methyl cellulose or an ethyl or methyl starch or an ethyl or methyl dextrin that is soluble in water and in aqueous ethanol solutions of the strength occurring in alcoholic beverages is dissolved in a quantity of water which as such or after having been made effervescent by any method known in the soda water art is used for being mixed with whisky or brandy or another liquor or with another alcoholic beverage. Mineral water can also be used.

*Example 6*

To a beer wort, an ethyl cellulose or methyl cellulose or an ethyl starch or methyl starch or an ethyl dextrin or methyl dextrin that is soluble in water and in aqueous ethanol solution is added in a proportion of about 10 to 25 per cent. calculated on the amount of ethanol expected in the final beer. After the carbohydrate ether has been added to the wort, the latter is submitted to fermentation and worked up into the final beer in the usual manner.

The aforesaid carbohydrate ethers being indifferent to all processes occurring in the manufacture of beer, their introduction may be effected almost at any stage of the beer manufacture. For example, they can be added also to the water intended for the preparation of the mash, or to the finished beer.

*Example 7*

To grape juice or must, so much of an ethyl cellulose or methyl cellulose or of an ethyl starch or methyl starch or of an ethyl dextrin or methyl dextrin that is soluble in water and in aqueous ethanol solution is added, in a proportion of about 10 to 25 per cent calculated on the amount of ethanol expected in the final wine. After addition of the carbohydrate the juice or must is fermented and worked up into wine in the usual manner.

The preparation of champagne or other sparkling wines according to the present invention will be clear from this example.

*Example 8*

The process is conducted as in any one of the foregoing examples, but with the difference that, instead of the alkyl ether used therein, a hydroxy-alkyl ether of a carbohydrate, for example a hydroxy-alkyl ether of cellulose or of starch, or of dextrin, soluble in water and in aqueous ethanol solution is used.

*Example 9*

The process is conducted as in any one of the above Examples 1 to 7, but with the exception that, instead of the simple alkyl ether used therein, a mixed alkyl ether of a carbohydrate or a mixed alkyl-hydroxy-alkyl ether of a carbohydrate or a mixed alkyl-aralkyl ether of a carbohydrate, for example a mixed ether of cellulose, or of starch, or of dextrin, that is soluble in water and in aqueous ethanol solution is used.

*Example 10*

The process is conducted as in any one of the Examples 1 to 7, but with the difference that, instead of the alkyl ether used therein, an alkyl-ether-ester, for example an ethyl cellulose acetate, or an ethyl starch acetate, or an ethyl dextrin acetate which is soluble in water and in aqueous ethanol solution is used.

*Example 11*

The process is conducted as in any one of the Examples 1 to 7, but with the exception that, instead of the alkyl ether used therein, a hydroxy-alkyl-ether-ester, for example a glycol cellulose acetate, or a glycol starch acetate, or a glycol dextrin acetate that is soluble in water and in aqueous ethanol solution is used.

The expression "carbohydrate of the type $n(C_6H_{10}O_5)$" used in the description and claims is intended to include all bodies belonging to the systems Nos. 4764 to 4774 inclusive of Beilstein's: System der organischen Verbindungen, Berlin 1922, page 144 and also set forth under the heading "Die nicht zuckerahnlicken Produkte" on pages 1024 to 1051 of the second part of the first volume of Victor Meyer and Paul Jacobson's: Lehrbuch der organischen Chemie, second edition, 1923.

The term "cellulose" used in the description and claims is, wherever the context permits, intended to include cellulose, its conversion and oxidation products, such as cellulose hydrate, hydrocellulose, oxycellulose, acid cellulose or the like.

The term "alkyl derivative" used in the description and claims is, wherever the context permits, intended to include simple and mixed alkyl derivatives, and such mixed ethers as contain alkyl and hydroxy-alkyl groups or alkyl and other ether groups.

The terms "beverage containing ethanol" or "alcoholic beverage" or "alcoholic drink" or "drink containing ethanol", mean, wherever the context permits, all and any beverages whatever containing ethanol.

The expression "alcoholic beverage at any stage of its preparation" used in the description and claims is intended to include the alcoholic beverages in their finished state or any intermediate products of their preparation or any parent or any subsidiary or additional materials, in short any materials used in their preparation.

And, the expression "alcoholic beverage at any stage of its preparation" is intended to include not only every stage of the preparation or treatment of finished alcoholic beverages, but also any stage of the preparation of alcoholic drinks by mixing alcoholic beverages with water or mineral water or soda water or the like or by mixing alcoholic beverages with one another as in the case of mixed drinks, such as cocktails or cobblers or the like.

The expression "ethanol in any form" used in the description and claims includes ethanol by itself intended for use in beverages, or ethanol in the form of a solution in, or in the form of a mixture with one or more other substances intended for beverages.

The expression "water of any kind" used in the claims is intended to include water of any kind, mineral water of any kind or soda water of any kind which may or may not contain other substances.

The expressions "reduce the inebriating power" or "reduce the inebriating capacity below the inebriating capacity corresponding to the proportion of ethanol contained therein" mean (in all inflections of "reduce" used in the description and claims) that the inebriating power is, according to the proportion of the substance capable of reducing the inebriating power of ethanol, particularly of the carbohydrate derivative, contained in the ethanol or alcoholic beverage and according to the quantity of ethanol taken or administered in the form of ethanol or another alcoholic beverage, reduced to any degree from nil, i. e. sobriety, to any degree of inebriating effect which is smaller than the degree of inebriating effect which certeris paribus, the same quantity of the same beverage is able to exert when taken or administered in the absence of a substance capable of reducing the inebriating power of ethanol or alcoholic beverages, particularly in the absence of one of the carbohydrate derivatives referred to in the description and claims.

The term "substantially non-poisonous" as used in the appended claims, is intended to mean that the carbohydrate derivatives employed are, in the concentration used in the alcoholic beverages, substantially harmless to the health of the individual.

It is to be understood that the foregoing detailed description is given merely by way of illustration and that many variations may be made therein without departing from the spirit of my invention.

I claim:

1. Any alcoholic beverage containing in solution at least one substantially non-poisonous derivative of the type $n(C_6H_{10}O_5)$ in which at least one hydroxyl hydrogen atom is substituted by an organic radical, said carbohydrate derivative being in a sufficient amount to reduce the inebriating effect of said beverage.

2. Any alcoholic beverage which contains in solution at least one substantially non-poisonous ether of a carbohydrate of the type $n(C_6H_{10}O_5)$, said ether being present in a sufficient amount to reduce the inebriating effect of said beverage.

3. Any alcoholic beverage which contains in solution at least one substantially non-poisonous alkyl ether of a carbohydrate of the type $n(C_6H_{10}O_5)$, said ether being in a sufficient amount to reduce the inebriating effect of said beverage.

4. Any alcoholic beverage which contains in solution at least one substantially non-poisonous mixed ether of a carbohydrate of the type $n(C_6H_{10}O_5)$, said ether being in a sufficient amount to reduce the inebriating effect of said beverage.

5. Any alcoholic beverage which contains in solution at least one substantially non-poisonous hydroxy-alkyl-alkyl ether of a carbohydrate of the type $n(C_6H_{10}O_5)$, said ether being present in a sufficient amount to reduce the inebriating properties of said beverage.

6. Any alcoholic beverage containing in solution at least one substantially non-poisonous derivative of a carbohydrate of the type $n(C_6H_{10}O_5)$ which is selected from the group consisting of carbohydrate ethers and carbohydrate etheresters, said derivative being soluble both in the full strength beverage and in the same after dilution with water, said carbohydrate derivative being present in a sufficient amount to reduce the inebriating properties of said beverage.

7. Any alcoholic beverage containing in solution at least one substantially non-poisonous etherified derivative of a carbohydrate selected from the group consisting of cellulose, starch, soluble starch, dextrine, inuline, lichenin, glycogen, a vegetable gum, a carbohydrate of tragacanth and a carbohydrate of agar-agar, in which derivative at least one hydroxyl hydrogen atom is substituted by an ether-forming group, and which derivative will remain in solution in the said alcoholic beverage when diluted with water, and has the property, when present in solution in said alcoholic beverage, of reducing the inebriating effect of said beverage, and said derivative being present therein at least in an amount sufficient to effect this result.

8. Any alcoholic beverage which contains in solution at least one substantially non-poisonous ether of a carbohydrate selected from the group consisting of cellulose, starch, soluble starch, dextrine, inuline, lichenin, glycogen, a vegetable gum, a carbohydrate of tragacanth and a carbohydrate of agar-agar, said ether being present in a sufficient proportion, relative to the ethanol content of said beverage to reduce the inebriating effect of said beverage.

9. Any alcoholic beverage which contains between about 3% and about 60% of ethanol, and which contains in solution at least one substantially non-poisonous derivative of a carbohydrate of the type $n(C_6H_{10}O_5)$ in which at least one hydroxyl hydrogen atom is substituted by an organic radical, said carbohydrate derivative being present therein in a sufficient amount to reduce the inebriating effect of said beverage, and which derivative is soluble in both the full strength alcoholic beverage and in said beverage when diluted with water.

10. Any alcoholic beverage containing between about 3% and about 60% of ethanol, and containing in solution, at least one substantially non-poisonous ether of a carbohydrate of the type $n(C_6H_{10}O_5)$, said ether being present in a sufficient amount to reduce the inebriating effect of said beverage.

11. Any alcoholic beverage containing between about 3% and about 60% of ethanol, and which contains in solution at least one substantially non-poisonous derivative of a carbohydrate of the type $n(C_6H_{10}O_5)$, said derivative being selected from the group consisting of carbohydrate ethers and carbohydrate ether-esters and being soluble in both the full strength beverage and in the same after dilution, said carbohydrate derivative being present in sufficient proportion, relatively to the ethanol content of said beverage, to reduce the inebriating properties of said beverage.

12. Any alcoholic beverage containing between about 3% and about 60% of ethanol and containing in solution at least one substantially non-poisonous substance selected from the herein described group of carbohydrate derivatives consisting of alkyl ethers, hydroxy-alkyl ethers, hydroxy-acid ethers, mixed ethers, and ether-esters, of cellulose, of starch, of soluble starch, of dextrine, of lichenin, of inuline, of glycogen, of tragacanth and of agar-agar, said carbohydrate derivative being present in said beverage in a sufficient proportion, relatively to the ethanol content of said beverage, to reduce the inebriating capacity of the said beverage.

13. Any alcoholic beverage as set forth in claim 12, in which the carbohydrate derivative is present in an amount of about 10% to about 25% of the actual ethanol contained in said beverage.

14. An alcoholic beverage of any kind having an ethanol content, a water content and a content of the characteristic other constituents of some particular alcoholic beverage, all in about normal proportions to each other as in beverages of that kind, and containing in solution an amount of a substantially non-poisonous etherified derivative of a carbohydrate of the type $n(C_6H_{10}O_5)$ equal to at least about 10% of the ethanol content present in said beverage, such beverage being of reduced inebriating quality as compared with the same alcoholic beverage but without said carbohydrate derivative.

15. Any alcoholic beverage which is still suitable as a beverage, and which contains in solution an organic derivative of a carbohydrate of the type $n(C_6H_{10}O_5)$ which derivative is substantially harmless to health and which derivative is selected from the herein described group consisting of ethers and ether-esters, which carbohydrate derivative is clearly soluble in both the full strength alcoholic beverage and in mixtures of the same with water, and which beverage, due to the presence of said carbohydrate derivative has a reduced inebriating effect as compared with the same alcoholic beverage but without said carbohydrate derivative.

16. Any alcoholic beverage which contains in solution at least one substantially non-poisonous ether of a carbohydrate of the type $n(C_6H_{10}O_5)$ which ether is soluble in aqueous ethanol solution and in water, said ether being present in a sufficient amount to reduce the inebriating effect of said beverage.

17. Any alcoholic beverage which contains in solution at least one substantially non-poisonous ether of a carbohydrate of the type $n(C_6H_{10}O_5)$ which ether is soluble in said beverage and in water, said ether being present in a sufficient amount to reduce the inebriating effect of said beverage.

LEON LILIENFELD.